(12) United States Patent
Li et al.

(10) Patent No.: US 12,437,135 B2
(45) Date of Patent: Oct. 7, 2025

(54) DYNAMIC LOADLINES FOR PROGRAMMABLE FABRIC DEVICES

(71) Applicant: Intel Corporation, Santa Clara, CA (US)

(72) Inventors: Yuet Li, Fremont, CA (US); Ankireddy Nalamalpu, Portland, OR (US); Atul Maheshwari, Portland, OR (US); Md Altaf Hossain, Portland, OR (US); Mahesh K. Kumashikar, Bangalore (IN); Mahesh A. Iyer, Fremont, CA (US)

(73) Assignee: Altera Corporation, San Jose, CA (US)

( * ) Notice: Subject to any disclaimer, the term of this patent is extended or adjusted under 35 U.S.C. 154(b) by 689 days.

(21) Appl. No.: 17/559,607

(22) Filed: Dec. 22, 2021

(65) Prior Publication Data

US 2022/0114316 A1   Apr. 14, 2022

(51) Int. Cl.

| | |
|---|---|
| *G06F 30/343* | (2020.01) |
| *G06F 1/26* | (2006.01) |
| *G06F 9/445* | (2018.01) |
| *G06F 9/455* | (2018.01) |
| *G06F 30/20* | (2020.01) |
| *G06F 30/331* | (2020.01) |
| *G06F 30/333* | (2020.01) |
| *G06F 30/34* | (2020.01) |
| *G06F 30/347* | (2020.01) |
| *G06F 30/367* | (2020.01) |
| *G06F 30/398* | (2020.01) |

(52) U.S. Cl.
CPC .............. *G06F 30/343* (2020.01); *G06F 1/26* (2013.01); *G06F 9/445* (2013.01); *G06F 9/455* (2013.01); *G06F 30/20* (2020.01); *G06F 30/331* (2020.01); *G06F 30/333* (2020.01); *G06F 30/34* (2020.01); *G06F 30/347* (2020.01); *G06F 30/367* (2020.01); *G06F 30/398* (2020.01)

(58) Field of Classification Search
CPC .......... G06F 30/343; G06F 1/26; G06F 30/34; G06F 30/347; G06F 30/20; G06F 30/331; G06F 30/333; G06F 30/367; G06F 30/398; G06F 9/445; G06F 9/455
USPC .... 716/102, 106, 111, 117, 136; 703/14, 28; 713/2, 100
See application file for complete search history.

(56) References Cited

U.S. PATENT DOCUMENTS

| | | | | |
|---|---|---|---|---|
| 5,062,055 | A * | 10/1991 | Chinnaswamy | G06F 11/34 702/182 |
| 10,802,807 | B1 * | 10/2020 | Hsu | G06F 8/433 |
| 11,080,449 | B2 * | 8/2021 | Teh | H03K 19/17744 |

(Continued)

*Primary Examiner* — Phallaka Kik
(74) *Attorney, Agent, or Firm* — Fletcher Yoder, P.C.

(57) ABSTRACT

Systems or methods of the present disclosure may provide for determining a loadline for operation of a programmable logic fabric where the loadline is based at least in part on design configuration details for a design or a configuration rather for generic deployment of the programmable logic device. The loadline may be determined using software modeling for the design or configuration. Additionally or alternatively, the loadline may be determined using runtime testing and sensing of real-world parameters. This determination based on real-world parameters of a deployment of the configuration or design is based on a determination of a step load for the design or configuration.

20 Claims, 6 Drawing Sheets

(56) References Cited

U.S. PATENT DOCUMENTS

| | | | |
|---|---|---|---|
| 11,188,132 B2* | 11/2021 | Shiao | G06F 1/266 |
| 2003/0137787 A1* | 7/2003 | Kumar | H02M 3/156 |
| | | | 361/18 |
| 2004/0261052 A1* | 12/2004 | Perry | G06F 30/347 |
| | | | 326/41 |
| 2005/0258862 A1* | 11/2005 | Rahim | H03K 19/1731 |
| | | | 326/38 |
| 2008/0164936 A1* | 7/2008 | Rahim | H03K 19/00369 |
| | | | 326/39 |
| 2008/0244491 A1* | 10/2008 | Ganesan | G06F 30/3312 |
| | | | 716/100 |
| 2011/0215779 A1* | 9/2011 | Lee | G05F 1/10 |
| | | | 323/282 |
| 2017/0074932 A1* | 3/2017 | Kourfali | G06F 30/331 |
| 2017/0272073 A1* | 9/2017 | Betz | H03K 19/1774 |
| 2017/0344086 A1* | 11/2017 | Hsiao | G05F 3/02 |
| 2020/0034929 A1* | 1/2020 | Rao | G06F 9/4881 |
| 2022/0113955 A1* | 4/2022 | Yu | H04B 10/29 |
| 2022/0116045 A1* | 4/2022 | Kumashikar | H03K 19/1776 |
| 2022/0335190 A1* | 10/2022 | Chen | G06F 30/343 |

\* cited by examiner

DYNAMIC LOADLINES FOR PROGRAMMABLE FABRIC DEVICES

BACKGROUND

The present disclosure relates generally to integrated circuit (IC) devices such as programmable logic devices (PLDs). More particularly, the present disclosure relates to techniques for dynamic loadlines for an integrated circuit device, such as a field programmable gate array (FPGA).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuit devices are found in a wide variety of products, including computers, handheld devices, industrial infrastructure, televisions, and vehicles. Many of these integrated circuit devices are application-specific integrated circuit (ASICs) that are designed and manufactured to perform specific tasks or processors, such as central processing units (CPUs) or graphics processing units (GPU). A programmable logic device such as an FPGA, by contrast, may be configured after manufacturing with a variety of different system designs. As such, programmable logic devices may be used for varying tasks and/or workloads based on user-specific designs/configurations. Power efficiency may be a concern with all integrated circuit devices. However, due to the client-specific designs and configurations of the programmable fabric devices, power management techniques may need to be more dynamic than may be readily available for processors or ASICs.

BRIEF DESCRIPTION OF THE DRAWINGS

Various aspects of this disclosure may be better understood upon reading the following detailed description and upon reference to the drawings in which.

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Semiconductor devices may use loadlines to control how the devices operate. For example, a loadline may be used to reduce/control thermal design power (TDP). However, a generic loadline for all users/customers using a programmable logic device may not be suitable many or even most users. Specifically, programmable logic devices are increasingly permeating markets and are increasingly enabling customers to implement circuit designs in logic fabric (e.g., programmable logic) due to the large amount of flexibility provided by the programmable logic devices. To provide this flexibility, a programmable logic fabric of an integrated circuit device may be programmed to implement a programmable circuit design to perform a wide range of functions and operations based on different designs or configurations loaded into the programmable fabric. The programmable logic fabric may include configurable blocks of programmable logic (e.g., sometimes referred to as logic array blocks (LABs) or configurable logic blocks (CLBs)) that have lookup tables (LUTs) that can be configured to operate as different logic elements based on the configuration programmed into memory cells in the blocks. However, this flexibility may cause a single loadline model to be inappropriate across all of the different possible designs causing some devices to operate inefficiently and/or causing some devices to function improperly (e.g., due to overheating). Instead, custom/dynamic loadlines that are specific for the configuration of the programmable logic fabric rather than the generic device may ensure efficient deployment for each customer/user/tenant based on their specific needs.

Figure 1:
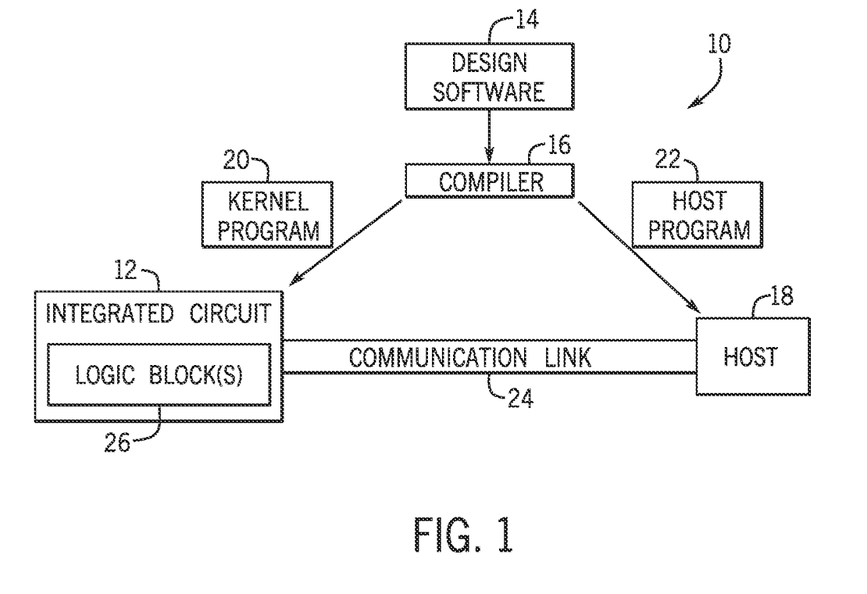
FIG. 1 is a block diagram of a system that may implement arithmetic operations using an integrated circuit device, in accordance with an embodiment of the present disclosure.

With the foregoing in mind, FIG. 1 illustrates a block diagram of a system 10 that may perform operations as described herein. A designer may desire to implement functionality, such as the operations of this disclosure, or an application involving operations on an integrated circuit device 12 (such as a field programmable gate array (FPGA)). The integrated circuit device 12 may implement a programmable system design to carry out the desired functionality. In some cases, the designer may specify a high-level program, such as an OPENCL® program, which may enable the designer to more efficiently and easily provide programming instructions to configure a set of programmable logic cells for the integrated circuit device 12 without requiring specific knowledge of low-level hardware description languages (e.g., Verilog or VHDL). For example, because OPENCL® is quite similar to other high-level programming languages, such as C++, designers of programmable logic familiar with such programming languages may have a reduced learning curve than designers that may have to learn unfamiliar low-level hardware description languages to implement new functionalities in the integrated circuit device 12.

Designers may implement their high-level designs using design software 14, such as a version of INTEL® QUARTUS® by INTEL CORPORATION. The design software 14 may use a compiler 16 to convert the high-level program into a lower-level description. The design software 14 may also be used to optimize and/or increase efficiency in the design. The compiler 16 may provide machine-readable instructions representative of the high-level program to a host 18 and the integrated circuit device 12. The host 18 may receive a host program 22, which may be implemented by kernel programs 20. To implement the host program 22, the host 18 may communicate instructions from the host program 22 to the integrated circuit device 12 via a communications link 24, which may be, for example, direct memory access (DMA) communications or peripheral component interconnect express (PCIe) communications. In some embodiments, the kernel programs 20 and the host 18 may enable configuration of one or more logic blocks 26 on the integrated circuit device 12. The logic block 26 may include circuitry and/or other logic elements and may be configured to implement arithmetic operations, such as addition and multiplication. The integrated circuit device 12 may include many (e.g., hundreds or thousands) of the logic blocks 26. Additionally, logic blocks 26 may be communicatively coupled to another such that data outputted from one logic block 25 may be provided to other logic blocks 26. The design software 14 and/or the compiler 16 may be implemented using any suitable memory and processor (e.g., CPU). For instance, the design software 14 and/or the compiler 16 may be run on the host 18 and/or any other computing devices suitable for executing design and compiling program applications.

The designer may use the design software 14 to generate and/or to specify a low-level program, such as the low-level hardware description languages described above. Further, in some embodiments, the system may be implemented without a separate host program. Moreover, in some embodiments, the techniques described herein may be implemented in circuitry as a non-programmable circuit design. Thus, embodiments described herein are intended to be illustrative and not limiting.

Figure 2:
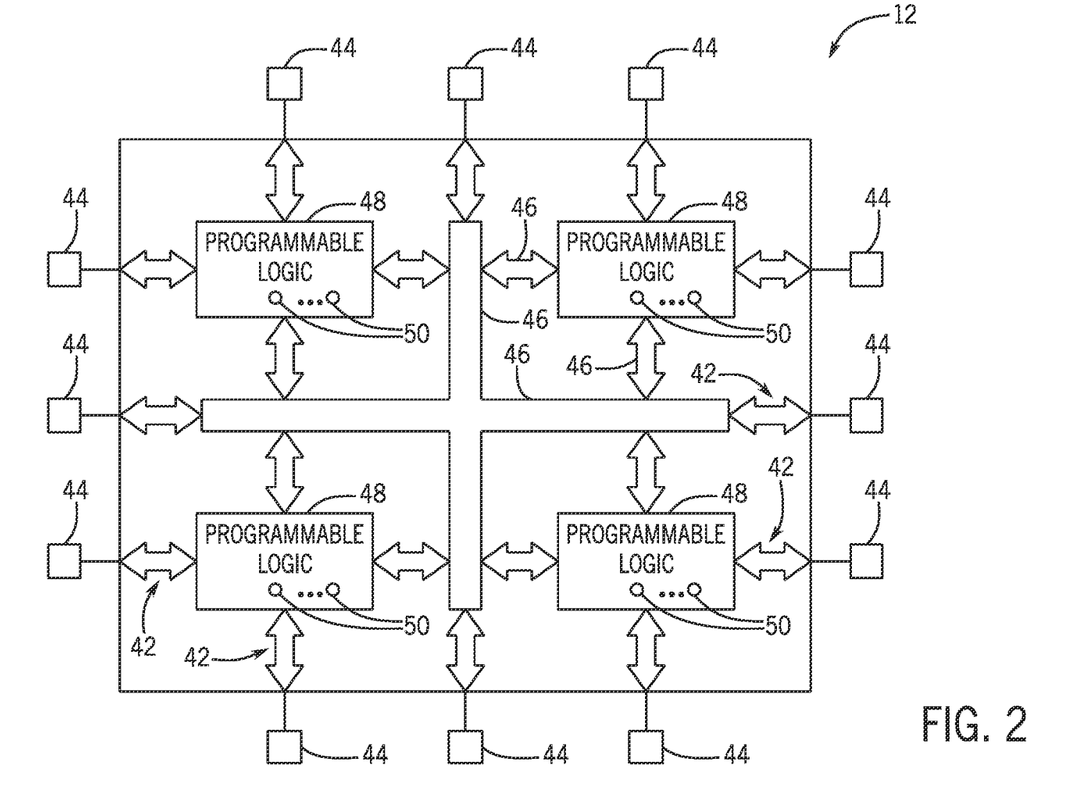
FIG. 2 is a block diagram of the integrated circuit device of FIG. 1, in accordance with an embodiment of the present disclosure.

Turning now to a more detailed discussion of the integrated circuit device 12, FIG. 2 illustrates a block diagram of the integrated circuit device 12 that may be a programmable logic device, such as an FPGA. Further it should be understood that the integrated circuit device 12 may be any other suitable type of programmable logic device (e.g., an application-specific integrated circuit and/or application-specific standard product). Additionally or alternatively, the integrated circuit device 12 may be any suitable integrated circuit device. In certain embodiments, the integrated circuit device 12 may not be a programmable logic device. As shown, the integrated circuit device 12 may have input/output circuitry 42 for driving signals off device and for receiving signals from other devices via input/output pins 44. Interconnection resources 46, such as global and local vertical and horizontal conductive lines and buses, and/or configuration resources (e.g., hardwired couplings, logical couplings not implemented by user logic), may be used to route signals on the integrated circuit device 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configurable to perform a custom logic function. The programmable interconnects associated with interconnection resources may be considered to be a part of programmable logic 48. The programmable logic 48 may include multiple various types of programmable logic 48 of different tiers of programmability. For example, the programmable logic 48 may include various mathematical logic units, such as an arithmetic logic unit (ALU) or configurable logic block (CLB) that may be configurable to perform various mathematical functions (e.g., addition, multiplication, and so forth).

Programmable logic devices, such as integrated circuit device 12, may contain programmable elements 50, such as configuration random-access-memory (CRAM) cells loaded with configuration data during programming and look-up table random-access-memory (LUTRAM) cells that may store either configuration data or user data, within the programmable logic 48. For example, a designer (e.g., a customer) may (re)program (e.g., (re)configure) the programmable logic 48 to perform one or more desired functions. By way of example, some programmable logic devices may be programmed or reprogrammed by configuring programmable elements 50 using mask programming arrangements, which is performed during semiconductor manufacturing. Other programmable logic devices are configured after semiconductor fabrication operations have been completed, such as by using electrical programming or laser programming to program programmable elements. In general, programmable elements 50 may be based on any suitable programmable technology, such as fuses, antifuses, electrically-programmable read-only-memory technology, random-access memory cells, mask-programmed elements, and so forth.

Figure 3:
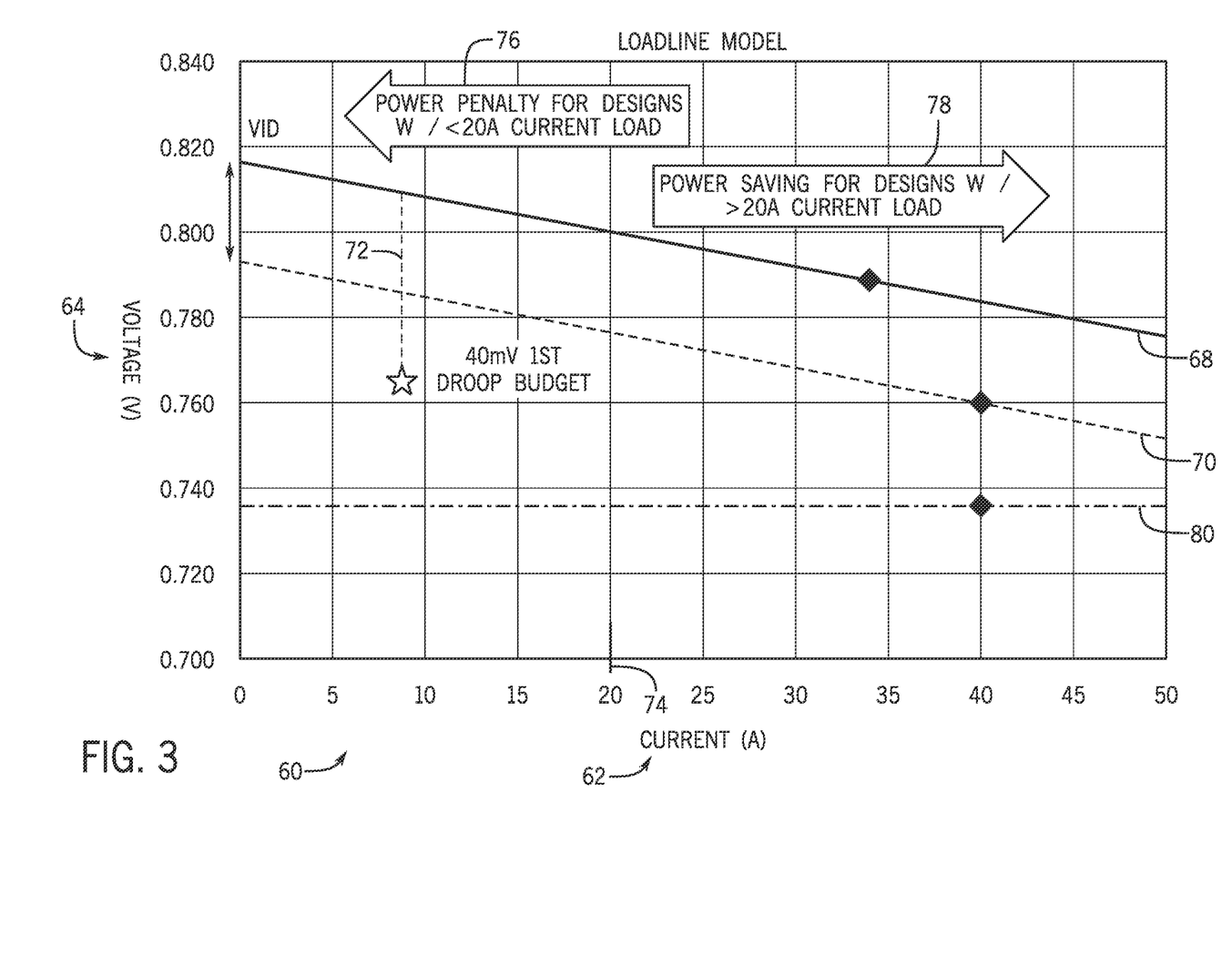
FIG. 3 is a graph of a loadline used to control operation of the integrated circuit device of FIG. 2, in accordance with an embodiment of the present disclosure.

FIG. 3 is a graphical representation 60 of a loadline model that may be used in operation of the programmable logic device. For instance, the loadline model may be used for the TDP of the integrated circuit device 12. As illustrated, the graphical representation 60 has an x-axis 62 and a y-axis 64. The illustrated x-axis 62 corresponds to a current for the integrated circuit device 12, but may be used to represent other operational parameters, such as temperature or other electrical parameters. Furthermore, the current may be an overall current used for the programmable fabric of the integrated circuit device 12 or may be a current for only a portion (e.g., a sector of multiple sectors or a power domain of multiple power domains) of the integrated circuit device 12. The illustrated y-axis 64 corresponds to a voltage of the integrated circuit device 12. Similar to the x-axis 62, the y-axis 64 may be used to represent other operational parameters, such as temperature or other electrical parameters. Furthermore, the voltage may be an overall voltage used for the programmable fabric of the integrated circuit device 12 or may be a voltage for only a portion (e.g., a sector of multiple sectors or a power domain of multiple power domains) of the integrated circuit device 12.

The graphical representation 60 of the loadline model also includes a maximum loadline 68 and a minimum loadline 70. The maximum loadline 68 and the minimum loadline provide a bound of operation for the integrated circuit device 12. The graphical representation 60 also specify various aspect for operation, such as a $1^{st}$ droop budget 72 (e.g., 40 mV), a margin or distance between the maximum loadline 68 and the minimum loadline 70, and/or other details. Where, for a given current, a voltage to be used lies between the maximum loadline 68 and the minimum loadline 70 or vice versa. Furthermore, when that are made for a current load less than a current 74 (e.g., 20 Amps), implementations in the region to the left of the current 74 pay a power penalty while designs that are made for a current load greater than the current save power using the loadline model. The graphical representation 60 also shows that a minimum voltage 80 may be specified to obtain a minimum speed for the integrated circuit device 12.

As previously discussed, loadline modeling may be consistent for a single integrated circuit device when they integrated circuit is a processor or an ASIC. However, a loadline-by device is difficult to apply to a programmable logic device (e.g., an FPGA) due to the dynamic nature of the programmable logic device. Specifically, the optimum loadline may be different designs may be different even when they may be implemented on the same programmable logic device. Instead, the dynamic loadline for a programmable logic device may change by customer/user to increase the efficiency of operating using the different designs.

Figure 4:
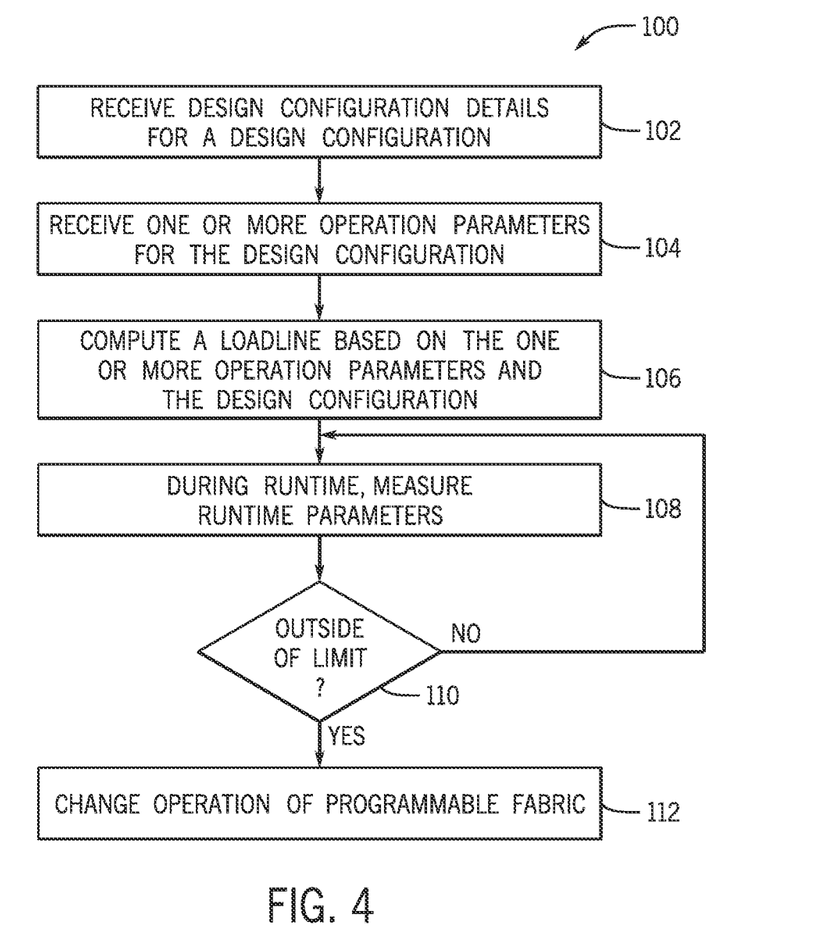
FIG. 4 is a flow diagram of a process used in generating and utilizing the loadline of FIG. 3, in accordance with an embodiment of the present disclosure.

One way to create optimal loadlines dynamically may be through software modeling. For example, for any given design, the design software 14 may compute a one or more parameters (e.g., maximum current load) based on specified workload and usage conditions for the design. The loadline may also be computed by matching a maximum IR drop through the loadline with a 1st droop budget and performance minimum voltage (Vmin) specification. The loadline specification and calculation model in the design software 14 may be performed on a per-design basis and may report power saving estimates on a per-design basis. A breakdown current may be supplied by rail to support multiple loadlines for designs with multiple rails. In other words, each supply rail may have its own dynamic loadline for the design FIG. 4 is a flow diagram of a process 100 utilizing software modeling to dynamically create a loadline that is custom-made for a design. The design software 14 receives design configuration details (block 102). The design configuration details specify how the programmable fabric is to function such as the operation(s) to be performed in the programmable fabric. The design configuration details may be received via a user interface (e.g., via a drop-down menu) and/or from memory. Additionally or alternatively, receiving the design configuration details may include compiling the design to receive the design configuration details. The design software 14 also receives one or more operation parameters for the design configuration (block 104). For example, the design software 14 may receive a specified voltage (e.g., voltage minimum) or other electrical parameters. The specification may be input directly and/or may be calculated based on a minimum performance (e.g., 1 GHz).

The one or more operation parameters may also include parameters related to the loadline. For instance, the design software 14 may receive a specification of the $1^{st}$ droop. Additionally or alternatively, the design software 14 may receive a specification of a margin to be added back when current sensing and/or temperature sensing diodes show that current draw has experienced an IR drop.

Using the design configuration (e.g., after compilation) and the one or more operation parameters, the design software 14 computes a loadline (block 106). As previously noted, the design may include multiple voltage rails. In such embodiments and other embodiments, computing the loadline may include computing multiple loadlines. The integrated circuit device 12 then operates according to the loadline.

In some embodiments, the integrated circuit device 12 may measure runtime parameters during operation (block 108). For example, the integrated circuit device 12 may utilize current sensing circuitry, temperature sensing circuitry, and/or voltage sensing circuitry. The integrated circuit device 12 determines whether the measured runtime parameters are outside of a limit (block 110). The integrated circuit device 12 may change operation of the programmable fabric (block 112). For instance, the integrated circuit device 12 may use the measured runtime parameters to determine that an IR drop has occurred and may cause voltage to be added back based on a specified margin. This change may be made using programmable voltage regulators in the programmable fabric implemented using fully integrated voltage regulators (FIVRs) and/or external voltage regulators. Furthermore, such voltage regulators may be used to change voltage levels in the programmable fabric when any other suitable reason for such changes exist. Additionally or alternatively, the measured runtime parameters may be used to determine that the design is to be recompiled. Based on the newly compiled design, the design software 14 determine a new loadline based on the newly compiled design.

Figure 5:
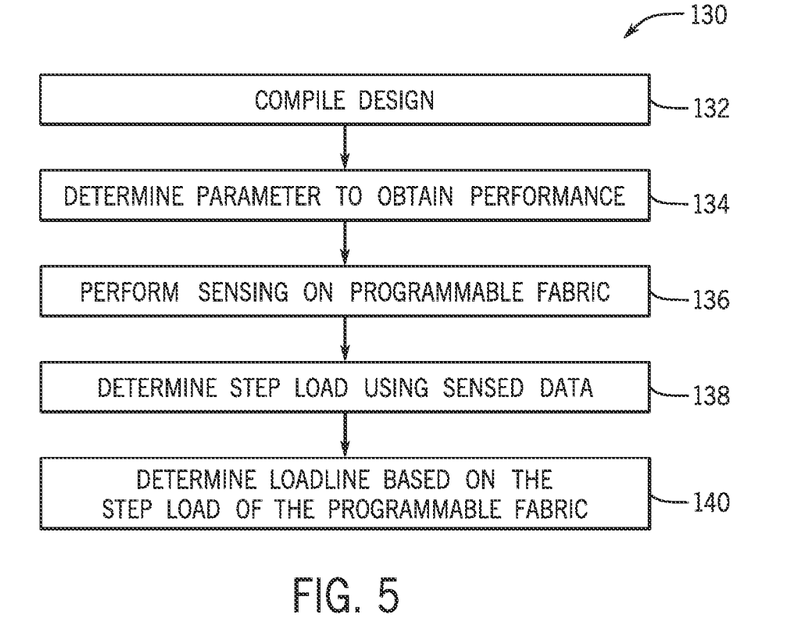
FIG. 5 is a flow diagram of a process used in generating and utilizing the loadline of FIG. 3, in accordance with an embodiment of the present disclosure.

In addition or alternative to software modeling-based loadline computations, the programmable fabric may use current sensing and temperature diodes to measure run-time current usage and adjust the loadline if current usage changes. For example, the design may meet a requirement, such as a required frequency (e.g., 1 GHz) and use the loadline to find an appropriate voltage to meet that requirement. FIG. 5 is a flow diagram of a process 130 that may be used to perform measurement-based loadline computation to determine loadlines dynamically. The design software 14/compiler 16 compiles a design (block 132). The design may be based at least in part on a desired performance or may be used on the compiled design. Accordingly, the design software 14 may determine a parameter (e.g., minimum voltage) to obtain the desired performance (block 134). The determination may be made by receiving a user input via a user interface of the design software 14. In some embodiments, this determination may be made prior to compilation and may be used in the compilation.

The integrated circuit device 12 may perform sensing during runtime using the design (block 136). The sensing may include current sensing, temperature sensing, voltage sensing, or sensing related to any other operating parameter. Using the sensed measurements, the integrated circuit device 12 or the host 18 may determine a step load for the design (block 138). Based on the step load, the design software 14 may determine a loadline for the design (block 140).

Figure 6:
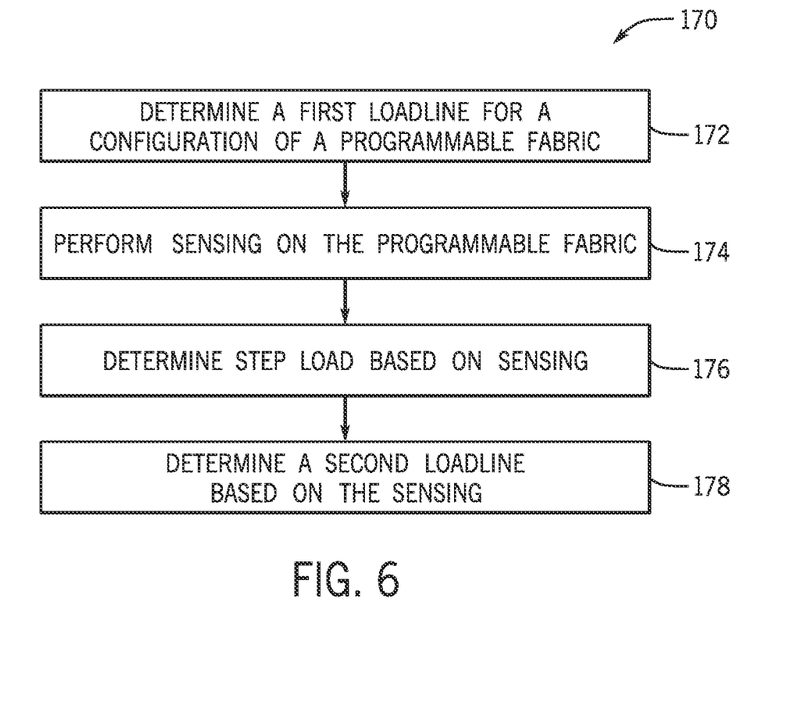
FIG. 6 is a flow diagram of a process used in generating and utilizing the loadline of FIG. 3, in accordance with an embodiment of the present disclosure.

In some embodiments, a loadline may be determine using software modeling, such as discussed in relation to the process 100 of FIG. 4, and later replaced by a loadline determined using real world measurements, such as discussed in relation to the process 130 of FIG. 5. FIG. 6 is a block diagram of a process 170 using both software-based and measurement-based loadline determinations. Before, during, and/or after compiling a design/configuration of the integrated circuit device 12, the design software 14 may determine a first loadline for the configuration (block 172). Such determination may be made according to the process 100 of FIG. 4. The integrated circuit device 12 may then use sensing on the programmable fabric of the programmable logic device (block 174). The design software 12, the host 18, and/or the integrated circuit device 12 may determine a step load based on the sensing (block 176). Based on the step load, the design software 14 may determine a second loadline (block 178).

The integrated circuit device 12 may adjust to using the new loadline using a recompilation of the configuration and/or by adjusting voltage regulation (VR). The recompilation may be a recompilation of the entire configuration or of only a local portion of the reconfiguration. Furthermore, adjustment using VR may be made by setting the voltage level directly. Additionally or alternatively, if using smart VR, an amount of resistance level may be sent to the VR that in turn sets the voltage level based on the resistance.

The integrated circuit device 12 may be a data processing system or a component included in a data processing system. For example, the integrated circuit device 12 may be a component of a data processing system 280 shown in FIG. 7. The data processing system 280 may include a host processor 282 (e.g., a central-processing unit (CPU)), memory and/or storage circuitry 284, and a network interface 286. The data processing system 280 may include more or fewer components (e.g., electronic display, user interface structures, application specific integrated circuits (ASICs)). The host processor 282 may include any suitable processor, such as an INTEL® Xeon® processor or a reduced-instruction processor (e.g., a reduced instruction set computer (RISC), an Advanced RISC Machine (ARM) processor) that may manage a data processing request for the data processing system 280 (e.g., to perform debugging, data analysis, encryption, decryption, machine learning, video processing, voice recognition, image recognition, data compression, database search ranking, bioinformatics, network security pattern identification, spatial navigation, or the like). The memory and/or storage circuitry 284 may include random access memory (RAM), read-only memory (ROM), one or more hard drives, flash memory, or the like. The memory and/or storage circuitry 284 may hold data to be processed by the data processing system 280. In some cases, the memory and/or storage circuitry 284 may also store configuration programs (bitstreams) for programming the integrated circuit device 12. The network interface 286 may allow the data processing system 280 to communicate with other electronic devices. The data processing system 280 may include several different packages or may be contained within a single package on a single package substrate.

Figure 7:
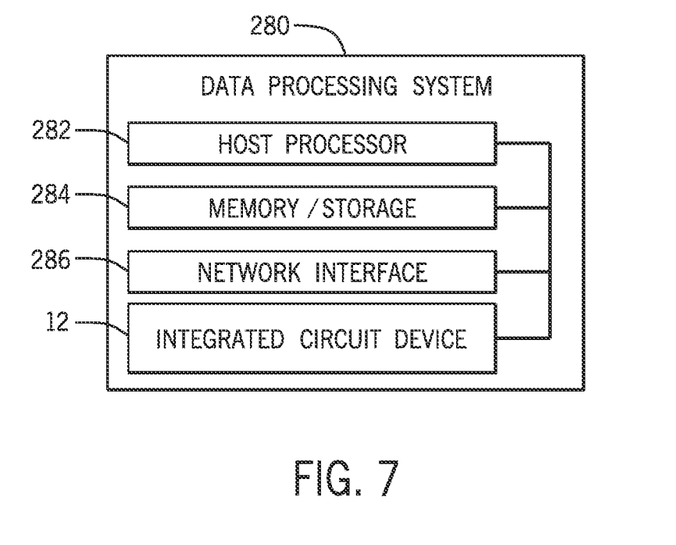
FIG. 7 is a data processing system, in accordance with an embodiment of the present disclosure.

In one example, the data processing system 280 may be part of a data center that processes a variety of different requests. For instance, the data processing system 280 may receive a data processing request via the network interface 286 to perform acceleration, debugging, error detection, data analysis, encryption, decryption, machine learning, video processing, voice recognition, image recognition, data compression, database search ranking, bioinformatics, network security pattern identification, spatial navigation, digital signal processing, or some other specialized task.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

Example Embodiment 1

A system comprising: memory storing instructions; a processor, that when executing the instructions, performs operations comprising: implementing design software that is used to design a configuration for a programmable fabric of a programmable logic device, wherein implementing the design software comprising: receiving design configuration details for the configuration; receiving one or more operation parameters for the designed configuration; computing a loadline for the designed configuration based at least in part on the one or more operation parameters; and causing the programmable logic device to be operated using the loadline.

Example Embodiment 2

The system of example embodiment 1, wherein the design configuration comprises multiple voltage rails.

Example Embodiment 3

The system of example embodiment 2, wherein the design software computes multiple loadlines.

Example Embodiment 4

The system of example embodiment 1 comprising the programmable logic device.

Example Embodiment 5

The system of example embodiment 4, wherein the programmable logic device comprises sensing circuitry that senses a runtime parameter during runtime of the programmable logic device.

Example Embodiment 6

The system of example embodiment 5, wherein the sensing circuitry comprises current sensing circuitry that measures a current as the runtime parameter.

Example Embodiment 7

The system of example embodiment 5, wherein the sensing circuitry comprises voltage sensing circuitry that measures a voltage as the runtime parameter.

Example Embodiment 8

The system of example embodiment 5, wherein the sensing circuitry comprises temperature sensing circuitry that measures a temperature as the runtime parameter.

Example Embodiment 9

The system of example embodiment 5, wherein the processor or the programmable logic device determines at least one parameter is outside of a limit and changes operation of the programmable logic device based on the determination that at least one parameter is outside of a limit.

Example Embodiment 10

The system of example embodiment 9, wherein the at least one parameter comprises an IR drop.

Example Embodiment 11

The system of example embodiment 10, wherein changing the operation comprises adding back more voltage to the operation of the programmable logic device.

Example Embodiment 12

The system of example embodiment 9, wherein changing the operation of the programmable logic device comprises changing a voltage level using a voltage regulator.

Example Embodiment 13

The system of example embodiment 9, wherein changing the operation of the programmable logic device comprises changing and recompiling the design configuration using the design software.

Example Embodiment 14

A method comprising: compiling a design for a programmable logic device; determining a parameter to obtain a specific performance level; performing sensing to acquire sensed data during operation to obtain at least one operation parameter; determining a step load using the sensed data during operation of the programmable logic device using the design; determining a loadline for the design based on the step load of the programmable logic device; and causing the programmable logic device to be operated according to the loadline.

Example Embodiment 15

The method of example embodiment 14 comprising receiving an indication of minimum performance in design software, wherein determining the parameter comprises determining a minimum value for the parameter to obtain the minimum performance.

Example Embodiment 16

The method of example embodiment 14, wherein the design comprises multiple voltage rails, and sensing the sensing comprises sensing the multiple voltage rails.

Example Embodiment 17

The method of example embodiment 16, wherein determining the loadline comprises determining loadlines on a per-voltage rail basis.

Example Embodiment 18

A method comprising: determining a first loadline for a configuration of a programmable fabric using design software; performing sensing using sensing circuitry in the programmable fabric to determine an operating condition; based at least in part on the operating condition, determine a step load for the configuration; and determine a new loadline based on the step load.

Example Embodiment 19

The method of example embodiment 18, wherein determining the first loadline comprises receiving input parameters via a user interface of the design software, and the design software computes the first loadline.

Example Embodiment 20

The method of example embodiment 19, wherein the input parameter comprises a voltage level, and the design software determines a maximum current based at least in part on the voltage level.

What is claimed is:
1. A system comprising:
  memory storing instructions;
  a processor, that when executing the instructions, performs operations comprising:
    implementing design software that is used to design a configuration for a programmable fabric of a programmable logic device, wherein implementing the design software comprising:
      receiving a specified workload;
      receiving design configuration details for the configuration;
      receiving one or more operation parameters for the designed configuration;
      computing a loadline specific to the designed configuration in the design software calculated using a software model and based at least in part on the one or more operation parameters including the specified workload and intended usage conditions; and
      causing the programmable logic device to be operated using the loadline.
2. The system of claim 1, wherein the design configuration comprises multiple voltage rails.
3. The system of claim 2, wherein the design software computes multiple loadlines.
4. The system of claim 1 comprising the programmable logic device.
5. The system of claim 4, wherein the programmable logic device comprises sensing circuitry that senses a runtime parameter during runtime of the programmable logic device.
6. The system of claim 5, wherein the sensing circuitry comprises current sensing circuitry that measures a current as the runtime parameter.
7. The system of claim 5, wherein the sensing circuitry comprises voltage sensing circuitry that measures a voltage as the runtime parameter.

8. The system of claim 5, wherein the sensing circuitry comprises temperature sensing circuitry that measures a temperature as the runtime parameter.

9. The system of claim 5, wherein the processor or the programmable logic device determines at least one parameter is outside of a limit and changes operation of the programmable logic device based on the determination that at least one parameter is outside of a limit.

10. The system of claim 9, wherein the at least one parameter comprises an IR drop.

11. The system of claim 10, wherein changing the operation comprises adding back more voltage to the operation of the programmable logic device.

12. The system of claim 9, wherein changing the operation of the programmable logic device comprises changing a voltage level using a voltage regulator.

13. The system of claim 9, wherein changing the operation of the programmable logic device comprises recompiling the design configuration using the design software, and reconfiguring the programmable logic device using the recompiled design configuration.

14. A method comprising:
compiling a design for a programmable logic device in design software;
determining a parameter to obtain a specific performance level;
computing, in the design software calculated using a software model, a loadline specific to the design based at least in part on one or more operation parameters including the specific performance level and intended usage conditions;
performing sensing to acquire sensed data during operation to obtain at least one operation parameter;
determining a step load using the sensed data during operation of the programmable logic device using the design;
updating the loadline for the design based on the step load of the programmable logic device; and
causing the programmable logic device to be operated according to the loadline.

15. The method of claim 14, comprising receiving an indication of minimum performance in the design software, wherein determining the parameter comprises determining a minimum value for the parameter to obtain the minimum performance.

16. The method of claim 14, wherein the design comprises multiple voltage rails, and sensing the sensing comprises sensing the multiple voltage rails.

17. The method of claim 16, wherein determining the loadline comprises determining loadlines on a per-voltage rail basis.

18. A method comprising:
receiving a specified workload for a configuration of a programmable fabric;
computing a first loadline specific to the configuration of a in design software calculated at least in part based on a software model and based on one or more operation parameters including the specified workload and intended usage conditions for the configuration;
performing sensing using sensing circuitry in the programmable fabric to determine an operating condition;
based at least in part on the operating condition, determining a step load for the configuration; and
determining a new loadline from the first loadline based on the step load.

19. The method of claim 18, wherein determining the first loadline comprises receiving input parameters via a user interface of the design software, and the design software computes the first loadline.

20. The method of claim 19, wherein the input parameters comprise a voltage level, and the design software determines a maximum current based at least in part on the voltage level.

* * * * *